US006940017B2

(12) United States Patent
Roesch et al.

(10) Patent No.: US 6,940,017 B2
(45) Date of Patent: Sep. 6, 2005

(54) BREAKAWAY MEMBER

(75) Inventors: Mark A. Roesch, Brecksville, OH (US); Dennis P. Reviock, Sr., Medina, OH (US); Cheryl Renee Carter, Chardon, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 10/832,157

(22) Filed: Apr. 26, 2004

(65) Prior Publication Data

US 2005/0056449 A1 Mar. 17, 2005

Related U.S. Application Data

(63) Continuation of application No. 10/662,801, filed on Sep. 15, 2003, and a continuation-in-part of application No. 10/725,987, filed on Dec. 2, 2003.

(51) Int. Cl.[7] .................................................. H01H 9/02

(52) U.S. Cl. ............................ 174/58; 174/53; 174/57; 220/3.2; 220/3.3; 220/3.8; 248/906

(58) Field of Search ............................. 174/48, 50, 53, 174/54, 57, 58, 61, 63, 17 R, 62; 220/3.2, 3.3, 3.4, 3.6, 3.7, 3.8, 3.9, 4.02; 361/600; 248/906, 343, 231.9; D13/152

(56) References Cited

U.S. PATENT DOCUMENTS

| | | | | |
|---|---|---|---|---|
| 1,206,431 A | | 11/1916 | Graybill | 220/3.4 |
| 1,818,317 A | | 8/1931 | Gilmore | |
| 1,929,844 A | | 10/1933 | Haas | 247/16 |
| 1,961,728 A | * | 6/1934 | Arnest et al. | 174/57 |
| 2,406,587 A | * | 8/1946 | Cooper | 248/906 |
| 2,644,600 A | | 7/1953 | Senif | 220/3.9 |
| 3,040,926 A | | 6/1962 | Palmer | 220/3.9 |
| 3,601,276 A | | 8/1971 | Culpepper | 220/3.8 |
| 3,676,571 A | | 7/1972 | Rubinstein | 174/65 |
| 3,701,451 A | | 10/1972 | Schindler et al. | 220/27 |
| 3,724,795 A | | 4/1973 | Callanan | 248/360 |
| 3,862,351 A | | 1/1975 | Schindler et al. | 174/58 |
| 3,863,021 A | | 1/1975 | Schindler et al. | 174/53 |
| 3,863,037 A | | 1/1975 | Schindler et al. | 174/58 |
| RE28,489 E | | 7/1975 | Schindler et al. | 174/58 |
| 3,917,101 A | | 11/1975 | Ware | 220/3.2 |
| 4,135,337 A | | 1/1979 | Medlin | 52/221 |
| 4,140,293 A | | 2/1979 | Hansen | 248/217.2 |
| 4,165,443 A | | 8/1979 | Figart et al. | 174/53 |
| 4,214,668 A | | 7/1980 | Neff et al. | 174/50 |
| 4,335,271 A | | 6/1982 | Haslbeck | 174/65 R |
| 4,348,547 A | | 9/1982 | Bowden, Jr. | 174/65 R |
| 4,428,492 A | | 1/1984 | Jorgensen | 220/3.94 |
| 4,447,030 A | | 5/1984 | Nattel | 248/27.1 |
| 4,483,453 A | | 11/1984 | Smolik | 174/58 |
| 4,497,416 A | | 2/1985 | Smolik | 220/3.5 |
| 4,533,060 A | | 8/1985 | Medlin | 220/3.9 |

(Continued)

OTHER PUBLICATIONS

Article from Electrical Product News entitled "New Union Dual Voltage Nonmetallic Box Introduced by Thomas & Betts"; Feb. 2001, p. 7.

Carlon catalog entitled "Carlon Zip Box Blue Nonmetallic Outlet and Switch Boxes," Jul., 2003, 20 pp.

*Primary Examiner*—Dean A. Reichard
*Assistant Examiner*—Angel R. Estrada
(74) *Attorney, Agent, or Firm*—Jones Day

(57) ABSTRACT

An electrical bracket for mounting an electrical device having a wall structure defining a front opening. In one embodiment, the bracket includes at least one breakaway mounting member which can be used to mount the bracket to a surface or be removed when the member is not needed. In another embodiment, the bracket includes at least one breakaway alignment member which can be used to align the bracket to a mountable surface or be removed when the member is not needed. The bracket can further be mounted to a surface in a plurality of orientations.

17 Claims, 5 Drawing Sheets

U.S. PATENT DOCUMENTS

| | | | | | |
|---|---|---|---|---|---|
| 4,569,458 | A | | 2/1986 | Horsley | 220/3.6 |
| 4,572,391 | A | | 2/1986 | Medlin | 220/3.9 |
| 4,612,412 | A | | 9/1986 | Johnston | 174/65 R |
| 4,637,422 | A | * | 1/1987 | Izzi, Sr. | 220/3.9 |
| 4,673,097 | A | | 6/1987 | Schuldt | 220/3.5 |
| 4,724,281 | A | | 2/1988 | Nix et al. | 174/53 |
| 4,747,506 | A | | 5/1988 | Stuchlik, III | 220/3.6 |
| 4,757,158 | A | | 7/1988 | Lentz | 174/53 |
| 4,794,207 | A | | 12/1988 | Norberg et al. | 174/48 |
| 4,843,189 | A | | 6/1989 | Jorgensen et al. | 174/53 |
| 4,844,275 | A | | 7/1989 | Schnell et al. | 220/3.9 |
| 4,927,039 | A | | 5/1990 | McNab | 220/3.7 |
| 4,942,071 | A | | 7/1990 | Frye | 428/40 |
| 4,964,525 | A | | 10/1990 | Coffey et al. | 220/3.9 |
| 4,968,855 | A | | 11/1990 | Le Paillier | 174/48 |
| 5,005,792 | A | | 4/1991 | Rinderer | 248/205.1 |
| 5,014,043 | A | | 5/1991 | Lopetrone et al. | 340/664 |
| 5,025,944 | A | | 6/1991 | Rodick | 220/3.3 |
| 5,064,386 | A | | 11/1991 | Dale et al. | 439/535 |
| 5,114,365 | A | | 5/1992 | Thompson et al. | 439/540 |
| 5,125,527 | A | | 6/1992 | Parlatore et al. | 220/266 |
| 5,243,134 | A | | 9/1993 | Nattel | 174/53 |
| 5,263,676 | A | | 11/1993 | Medlin, Jr. et al. | 248/300 |
| 5,287,665 | A | | 2/1994 | Rath, Jr. | 52/220.8 |
| D345,142 | S | | 3/1994 | Porter | D13/156 |
| 5,289,934 | A | | 3/1994 | Smith et al. | 220/3.7 |
| 5,301,437 | A | | 4/1994 | Burke | 33/562 |
| 5,354,953 | A | | 10/1994 | Nattel et al. | 174/54 |
| 5,357,055 | A | | 10/1994 | Sireci | 174/48 |
| 5,386,959 | A | | 2/1995 | Laughlin et al. | 248/205.1 |
| 5,408,045 | A | | 4/1995 | Jorgensen et al. | 174/58 |
| 5,448,011 | A | | 9/1995 | Laughlin | 174/48 |
| 5,450,974 | A | | 9/1995 | Lippa | 220/3.9 |
| 5,486,650 | A | | 1/1996 | Yetter | 174/53 |
| 5,509,560 | A | | 4/1996 | Nash | 220/3.9 |
| 5,574,255 | A | | 11/1996 | Simmons | 174/53 |
| 5,579,939 | A | | 12/1996 | Bourassa | 220/3.3 |
| 5,594,207 | A | | 1/1997 | Fabian et al. | 174/58 |
| 5,595,362 | A | | 1/1997 | Rinderer et al. | 248/27.1 |
| 5,596,174 | A | | 1/1997 | Sapienza | 174/57 |
| 5,598,998 | A | | 2/1997 | Lynn | 248/300 |
| 5,600,093 | A | | 2/1997 | Herth et al. | 174/53 |
| 5,646,371 | A | | 7/1997 | Fabian | 174/58 |
| 5,677,512 | A | | 10/1997 | Reiker | 174/58 |
| 5,710,392 | A | | 1/1998 | Bordwell et al. | 174/50 |
| 5,717,164 | A | | 2/1998 | Shetterly | 174/58 |
| 5,744,753 | A | | 4/1998 | Nattel | 174/58 |
| 5,789,706 | A | | 8/1998 | Perkins | 174/65 |
| 5,810,303 | A | | 9/1998 | Bourassa et al. | 248/205.1 |
| 5,833,110 | A | | 11/1998 | Chandler et al. | 220/3.9 |
| 5,841,068 | A | | 11/1998 | Umstead et al. | 174/58 |
| D404,715 | S | | 1/1999 | Almond | D13/152 |
| 5,863,016 | A | | 1/1999 | Makwinski et al. | 248/27.1 |
| D405,422 | S | | 2/1999 | Tennefoss et al. | D13/152 |
| 5,883,331 | A | | 3/1999 | Reiker | 174/54 |
| 5,965,844 | A | | 10/1999 | Lippa | 174/49 |
| 5,998,732 | A | | 12/1999 | Caveney et al. | 174/48 |
| D422,266 | S | | 4/2000 | Roesch | D13/152 |
| 6,051,785 | A | | 4/2000 | Baldwin et al. | 174/54 |
| 6,057,509 | A | | 5/2000 | Simmons | 174/53 |
| D427,889 | S | | 7/2000 | Gretz | D8/354 |
| 6,091,023 | A | | 7/2000 | O'Donnell | 174/57 |
| 6,093,890 | A | | 7/2000 | Gretz | 174/58 |
| 6,103,974 | A | | 8/2000 | Erdfarb | 174/66 |
| 6,108,331 | A | | 8/2000 | Thompson | 370/352 |
| 6,147,304 | A | | 11/2000 | Doherty | 174/48 |
| 6,194,657 | B1 | | 2/2001 | Gretz | 174/53 |
| 6,198,045 | B1 | * | 3/2001 | Roesch | 174/58 |
| 6,204,450 | B1 | | 3/2001 | Reiker | 174/58 |
| 6,207,898 | B1 | | 3/2001 | Reiker | 174/61 |
| 6,242,696 | B1 | | 6/2001 | Reiker | 174/62 |
| 6,281,439 | B1 | | 8/2001 | Reiker | 174/62 |
| 6,300,567 | B1 | | 10/2001 | Hayduke et al. | 174/58 |
| 6,323,424 | B1 | | 11/2001 | He | 174/58 |
| 6,376,770 | B1 | | 4/2002 | Hyde | 174/50 |
| D457,140 | S | | 5/2002 | Roesch et al. | D13/152 |
| 6,384,336 | B1 | | 5/2002 | VanderVelde et al. | 174/48 |
| 6,418,036 | B1 | * | 7/2002 | Rodrigues | 174/50 |
| D462,664 | S | | 9/2002 | Roesch et al. | D13/152 |
| 6,452,098 | B1 | | 9/2002 | Gretz | 174/59 |
| 6,484,980 | B2 | | 11/2002 | Medlin, Sr. et al. | 248/205.1 |
| 6,508,445 | B1 | | 1/2003 | Rohmer | 248/200 |
| 6,566,600 | B1 | * | 5/2003 | Ford et al. | 174/50 |
| 6,624,355 | B1 | | 9/2003 | Gretz | 174/59 |
| 6,749,162 | B2 | * | 6/2004 | Nicolides et al. | 248/231.9 |
| 6,753,472 | B2 | * | 6/2004 | Ito | 174/50 |
| 2003/0024725 | A1 | | 2/2003 | Lalancette et al. | 174/58 |
| 2004/0045960 | A1 | * | 3/2004 | Rose | |

* cited by examiner

BREAKAWAY MEMBER

CROSS-REFERENCE TO RELATED APPLICATIONS

This application is a continuation of copending U.S. patent application Ser. No. 10/662,801, filed Sep. 15, 2003; and a continuation-in-part of U.S. patent application Ser. No. 10/725,987, filed Dec. 2, 2003, which claims priority to U.S. Pat. No. 6,710,245, issued on Mar. 23, 2004, the disclosures of which are hereby incorporated by reference in their entirety.

TECHNICAL FIELD

This technology relates to electrical brackets and electrical boxes.

BACKGROUND

A low-voltage electrical frame is used to attach an electrical device, such as a cable jack, to a wall stud. This is done by first fastening the frame to the stud. Next, the device is inserted into the frame and fastened to the frame with screws.

SUMMARY

An electrical bracket embodying the example technology is for mounting an electrical device to a wall stud. The bracket comprises a rectangular frame having first and second opposite end walls and first and second opposite side walls. The bracket further comprises a front opening surrounded by the end walls and side walls for inserting an electrical device into the frame. The frame has an end-mounted position in which the first end wall faces the stud. A fastening structure, connected to the frame, is configured to be fastened to the stud when the frame is in the end-mounted position. An extension extends from the first end wall to a location rearward from the side walls. A stabilizer extends from the extension into abutting contact with the stud at a location rearward from the side walls when the frame is in the end-mounted position.

Preferably, the abutting contact by the stabilizer is with a side surface of the stud, and the fastening structure extends from the first end wall in a direction away from the second end wall for being fastened to a front surface of the stud. The extension is a plate extending rearward from, and parallel to, the first end wall. The stabilizer is a plate that is perpendicular to the first end wall. The location of the abutting contact is spaced from the first end wall in a direction away from the second end wall so as to space the first end wall from the stud when the frame is in the end-mounted position.

In a second embodiment, the frame has an end-mounted position in which the first end wall faces a side surface of the stud. A fastening tab extends from the first end wall in a direction away from the second end wall. The fastening tab is configured to be fastened to a front surface of the stud when the frame is in the end-mounted position. A spacer extends from the first end wall in a direction away from second end wall. The spacer is configured to abut the side surface of the stud and space the first end wall from the side surface when the frame is in the end-mounted condition.

Preferably, the spacer is a fastener support configured to capture a stud-penetrating fastener that fastens the bracket to the stud when the frame is in a side-mounted position in which the first side wall faces the stud. The spacer is configured to abut the side surface of the stud along a transversely extending line of abutment.

In yet another embodiment, an electrical bracket comprises a wall structure defining a front opening and at least one mounting member coupled to the wall structure for attaching the wall structure to a stud. The at least one mounting member is coupled to the wall structure along a weakened portion that is configured to be broken away from the wall structure with the application of a force sufficient to break the weakened portion.

In another embodiment, an electrical bracket comprises a wall structure defining a front opening and a first mounting member for mounting the wall structure to a stud in a first orientation. The first mounting member is coupled to the wall structure of the bracket along a weakened portion that is positioned between the first mounting member and the wall structure. The first mounting member is configured to be broken away from the wall structure of the bracket with the application of a force sufficient to break the weakened portion.

DESCRIPTION

Figure 1:
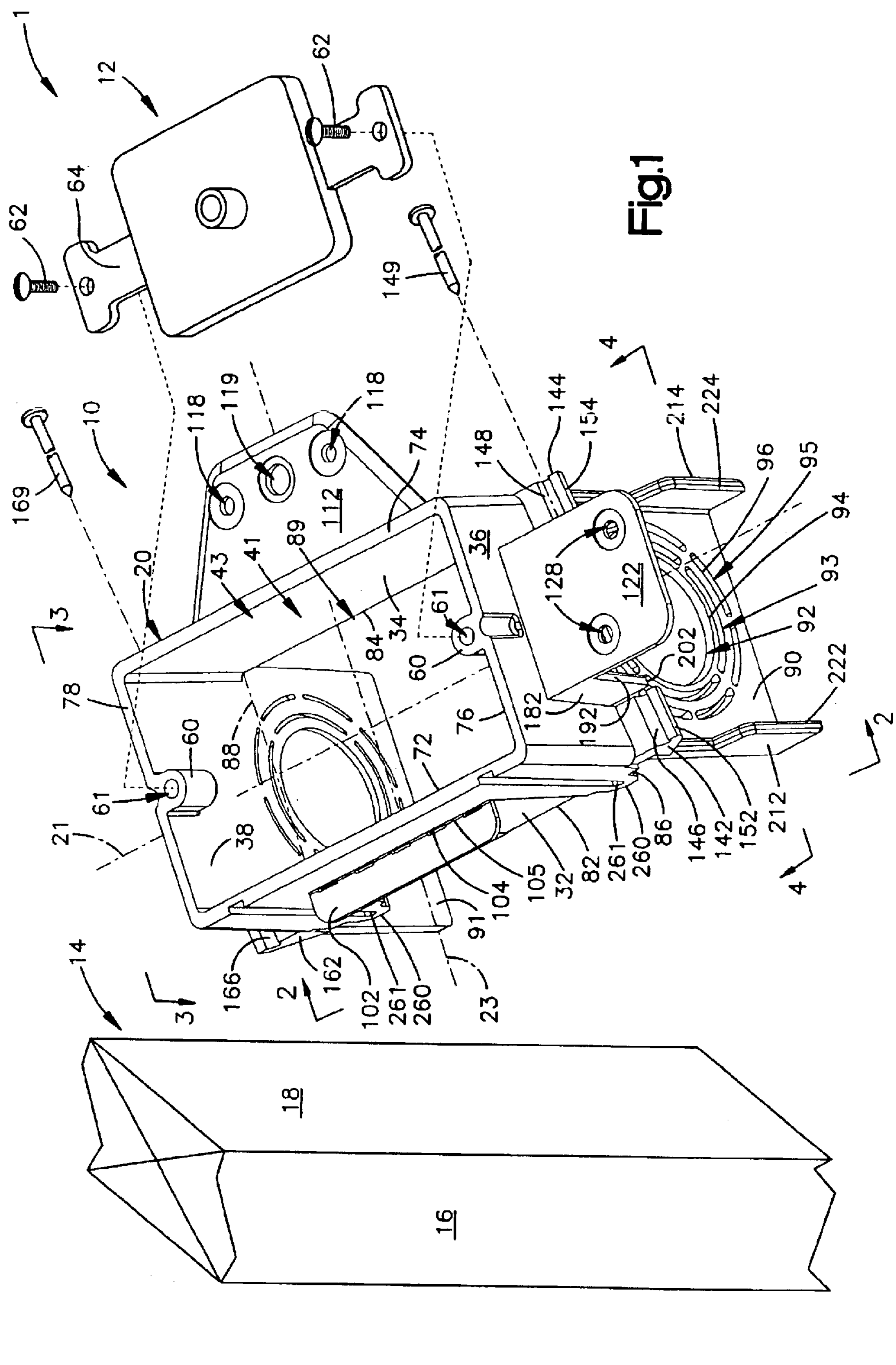
FIG. 1 is a perspective view of an example bracket, shown alongside an electrical device that can be fastened to the bracket and also alongside a wall stud to which the bracket can be fastened.

The apparatus 1 shown in FIG. 1 has parts which, as described below, are examples of the elements recited in the claims.

The apparatus includes an electrical bracket 10. The bracket 10 is used for mounting a low-voltage electrical device, such as a cable jack 12, to a wall stud 14 with front and side surfaces 16 and 18. The bracket 10 includes a rectangular frame 20 for enclosing the electrical device 12. The frame 20 is centered on perpendicular longitudinal 21 and lateral axes 23. The frame 20 has longitudinally-extending first and second opposite side walls 32 and 34. The frame 20 further has transversely-extending first and second opposite end walls 36 and 38. The walls 32, 34, 36 and 38 define a cavity 41 and surround a front opening 43 through which the electrical device 12 can be inserted into the cavity 41.

The frame 20 can be mounted to the stud 14 in three positions. In a first side-mounted position of the frame 20, the first side wall 32 faces and abuts the side surface 18 of the stud 14. In a second side-mounted position of the frame 20, the second side wall 34 faces and abuts the side surface 18 of the stud 14. In an end-mounted position of the frame 20, the first end wall 36 faces, but is spaced from, the side surface 18 of the stud 14. Adjoining the frame 20 are various structures for securing the device 12 to the frame 20, attaching the frame 20 to a stud 14 and stabilizing the frame 20 relative to the stud 14. These structures are described as follows.

Two mounting bosses 60 extend inward from respective end walls 36 and 38, adjacent to the front opening 43. Each boss 60 has a bore 61 for securing the electrical device 12 to the frame 20. This is done by inserting two self-threading screws 62 through a yoke 64 of the device 12 and screwing the screws 62 into the bores 61.

Each wall 32, 34, 36 and 38 shown in FIG. 1 has a front end 72, 74, 76 and 78 located at the front opening 43 of the frame 20. The front ends 72, 74, 76 and 78 are defined by edges of the walls 32, 34, 36 and 38. Each of the walls 32, 34, 36 and 38 further has a rear end 82, 84, 86 and 88 located at a rear opening 89 of the frame 20.

Figure 2:
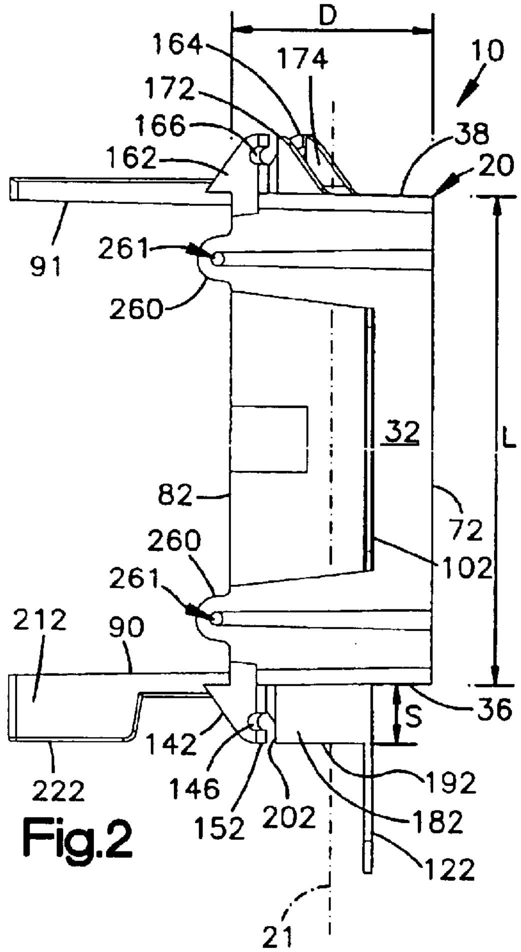
FIG. 2 is a view of the bracket taken at line 2—2 of FIG. 1.
Figure 3:
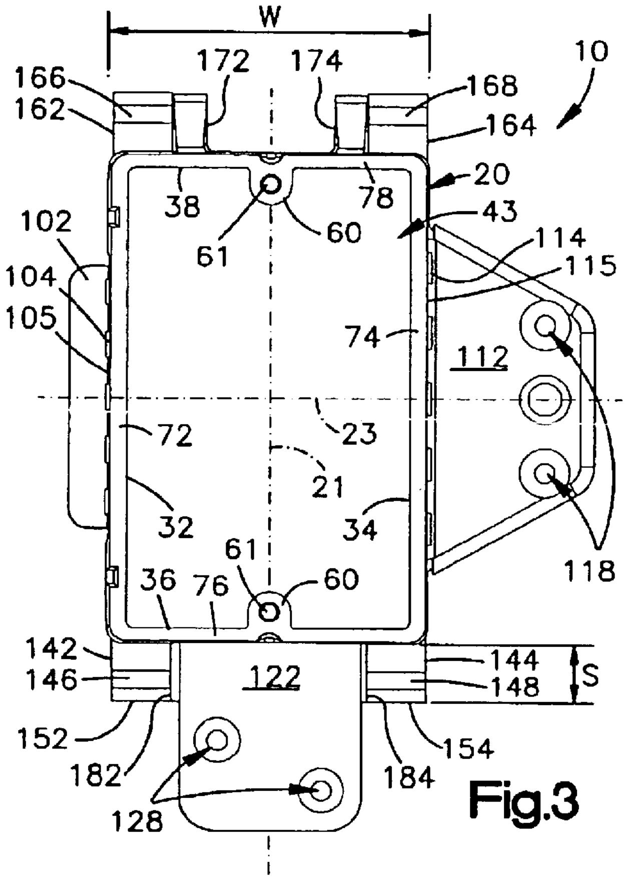
FIG. 3 is a view of the bracket taken at line 3—3 of FIG. 1.

As shown in FIGS. 2 and 3, a length L of the frame 20 is defined by the end walls 36 and 38. A width W of the frame 20 is defined by the side walls 32 and 34. A depth D of the frame 20 is defined by and between the front and rear ends 72 and 82 of the side walls 32 and 34. The rear ends 82 and 84 of the side walls 32 and 34 are defined by edges of the side walls 32 and 34. However, the rear ends 86 and 88 of the end walls 36 and 38, denoted by a dashed lines in FIGS. 1 and 4, do not correspond to a visible structural feature. That is due to first and second extension plates 90 and 91 extending seamlessly from the rear ends 86 and 88-of first and second end walls 36 and 38. The extension plates 90 and 91 extend rearward from, and parallel to, the respective end walls 36 and 38 to a location rearward from the side walls 32 and 34.

Each extension plate 90 and 91 has a pass-through hole 92. The hole 92 is for passing electrical wires from outside the frame 20 to the device 12 in the frame 20. A semicircular first perforation 93 in the plate 90 encircles the hole 91 to define a first knock-out 94 that is larger than, and concentric with, the hole 91. A semicircular second perforation 95 in the plate 90 encircles the first knock-out 94 to define a second knock-out 96 that is larger than, and concentric with, the first knockout 94.

Figure 4:
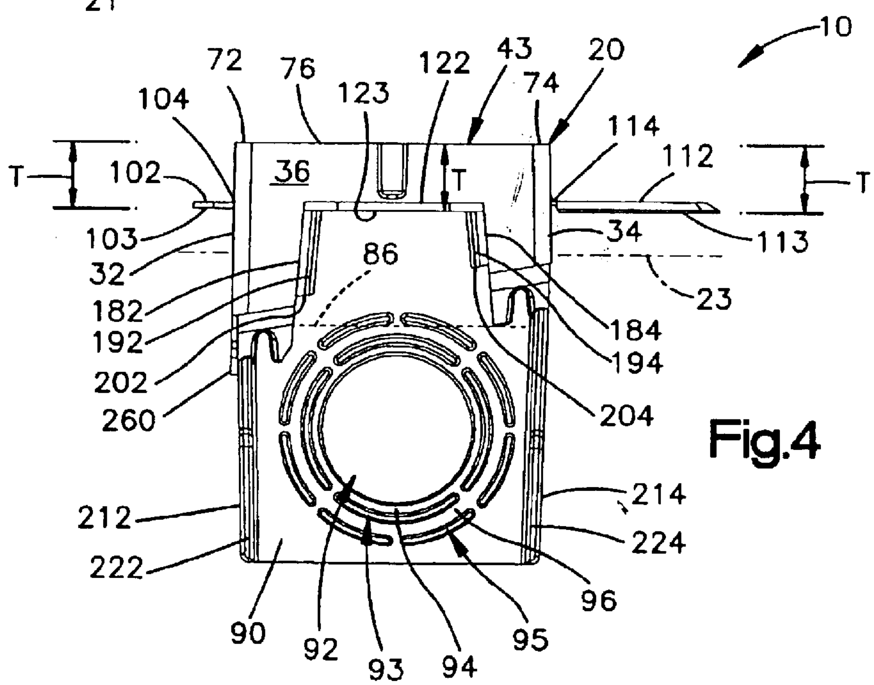
FIG. 4 is a view of the bracket taken at line 4—4 of FIG. 1.

A first side tab 102 is best shown in FIGS. 1 and 4. It extends orthogonally from the first side wall 32 in a direction transversely away from the second side wall 34. The first side tab 102 is configured to overlie the front surface 16 of the stud 14 when the frame 20 is being mounted in the first side-mounted position. A rear surface 103 of the first side tab 102 is spaced rearwardly from the front end 76 of the first side wall 32 by a distance T equal to the thickness of drywall (not shown) that will overlie the- stud 14. This is so that, when the tab 102 overlies the front stud surface 16, the front edges 72, 74, 76 and 78 of the fame 20 will be flush with the front surface of the drywall. The first side tab 102 has a perforation 104 along its line of adjoinment 105 with the frame 20. This enables the tab 102 to be removed from the frame 20 for applications where the tab 102 is not needed.

A second side tab 112 extends orthogonally from the second side wall 34 in a direction transversely away from the first side wall 32. The second side tab 112 is configured to overlie the front surface 16 of the stud 14 when the frame 20 is mounted in the second side-mounted position. A rear surface 113 of the side tab 112 is spaced rearwardly from the front opening 43 by the distance T equal to the thickness of the drywall. This is so that, when the tab 1 12 overlies the front stud 14 surface, the front edges 72, 74, 76 and 78 of the frame 20 will be flush with the front surface of the drywall.

Like the first side tab 102, the second side tab 112 has a perforation 114 along its line of djoinment 115 with the frame 20, as shown in FIG. 3. This enables the second side tab 112 to be removed from the frame 20 if the second side tab 112 is not needed. The tab 112 has two nail holes 118 for fastening the tab 112 to the front surface 16 of the stud 14 with nails. The tab 112 further has a staple hole 119 for fastening the frame 10 to the stud 14 with a staple (not shown). The staple can be hammered into the stud 14, with one leg of the staple passing through the stapling hole 119, and the other leg of the staple passing through one of the nail holes 118.

An end tab 122 is best shown in FIGS. 1 and 4. It extends orthogonally from the first end wall 36 in a direction longitudinally away from the second end wall 38. The end tab 122 is configured to overlie the front surface 16 of the stud 14 when the frame 20 is mounted in the end-mounted position. As with the other tabs 102 and 112, a rear surface 123 of the end tab 122 is spaced rearwardly from the front opening 43 by the thickness T of the drywall. The end tab 122 has nail holes 128 for fastening the end tab 122 to the front stud surface 16 with nails.

A pair of first nail supports 142 and 144 are best shown in FIGS. 1 and 3. The first supports 142 and 144 extend from the first end wall 36 in a direction away from the second end wall 36. The supports 142 and 144 adjoin the first end wall 36 at transversely opposite sides of the first end wall 36. Each support 142 and 144 has a groove surface 146 and 148 configured to support and retain a first nail 149 in an orientation in which the nail 149 extends alongside the first end wall 36 and into the side surface 18 of the stud 14 when the frame 20 is in the first side-mounted position. Each support 142 and 144 further has a distal end defined by a stud abutting edge 152 and 154 that is parallel to the first end surface 36 and spaced a stand-off distance S from the first end wall 36. The stud abutting edge 152 and 154 is configured to abut the side surface 18 of the stud 14 along a transversely-extending line of abutment that is spaced from the first end wall 36 in a direction toward the stud 14 when the frame 20 is in the end-mounted position. The nail supports 142 and 144 thus space the frame 20 longitudinally away from the side surface 18 of the stud 14.

A pair of second nail supports 162 and 164 extend from the second end wall 38 in a direction away from the first end wall 36. The second nail supports 162 and 164 adjoin the second end wall 38 at transversely opposite sides of the second end wall 38. Each support 162 and 164 has a groove surface 166 and 168 configured to support a second nail 169 in an orientation in which the nail 169 extends alongside the second end wall 38 and into the side surface 18 of the stud 14 when the frame 20 is in the first side-mounted position.

Two nail retainers 172 and 174 are best shown in FIGS. 2 and 3. The retainers 172 and 174 extend longitudinally from the second end wall 38 in a direction away from the first wall 36. The two nail retainers 172 and 174 are transversely spaced from each other and are respectively adjacent the two second nail supports 162 and 164. The nail retainers 172 and 174 are configured to urge the second nail 169 (FIG. 1) against the groove surfaces 166 and 168 of the second nail supports 162 and 164, to retain the second nail 169 in the groove surfaces 166 and 168. The second nail 169 is thus captured between the nail retainers 172 and 174 and the groove surfaces 166 and 168.

Two front spacers 182 and 184 are best shown in FIGS. 2 and 4. They extend from the first end wall 36 in a direction longitudinally away from the second end wall 38. The front spacers 182 and 184 adjoin the first end wall 36 adjacent transversely opposite sides of the end tab 112. Each front spacer 182 and 184 is in the form of a plate that is approximately parallel to the side walls 32 and 34 and orthogonal to the end walls 36 and 38.

Each front spacer 182 and 184 has a stud abutting edge 192 and 194. The stud abutting edges 192 and 194 extend rearward from transversely opposite edges 196 of the end tab 112. The stud abutting edges 192 and 194 are spaced from the first end wall 36 by the stand-off distance S. Each stud abutting edge 192 and 194 is configured to abut the side surface 18 of the stud 14 along a line of abutment when the frame 20 is in the end-mounted position. The front spacers 182 and 184 stabilize and space the frame 20 longitudinally away from the side surface 18 of the stud 14.

Each front spacer 182 and 184 further has a longitudinally-extending nail abutting edge 202 and 204. The nail abutting edges 202 and 204 are configured to urge the first nail 149 (FIG. 1) against the groove surfaces 146 and 148 of the first nail supports 142 and 144, to retain the first nail 149 in the groove surfaces 146 and 148. The first nail 149 is thus captured between the groove surfaces 146 and 148 and the nail abutting edges 202 and 204.

Two rear spacers 212 and 214 are best shown in FIGS. 2 and 4. They extend from transversely opposite edges of the first extension plate 90 in a direction longitudinally away from the second extension plate 91. Each rear spacer 212 and 214 is a plate that is approximately parallel to the side walls 32 and 34 and perpendicular to the end walls 36 and 38.

Each rear spacer 212 and 214 has a stud-abutting edge 222 and 224 that is parallel to the end surface 36. These stud-abutting edges 222 and 224 are spaced the stand-off distance S from the extension plate 90, so as to be coplanar with the other stud-abutting edges 152, 154, 192 and 194. Each stud-abutting edge 222, 224, 152, 154, 192 and 194 is configured to engage the side surface 18 of the stud 14 along a longitudinally extending line of contact when the frame 20 is in the end-mounted position. The rear spacers 212 and 214, like the front spacers 182 and 184, stabilize and space the frame 20 longitudinally away from the side surface 18 of the stud 14.

Figure 5:
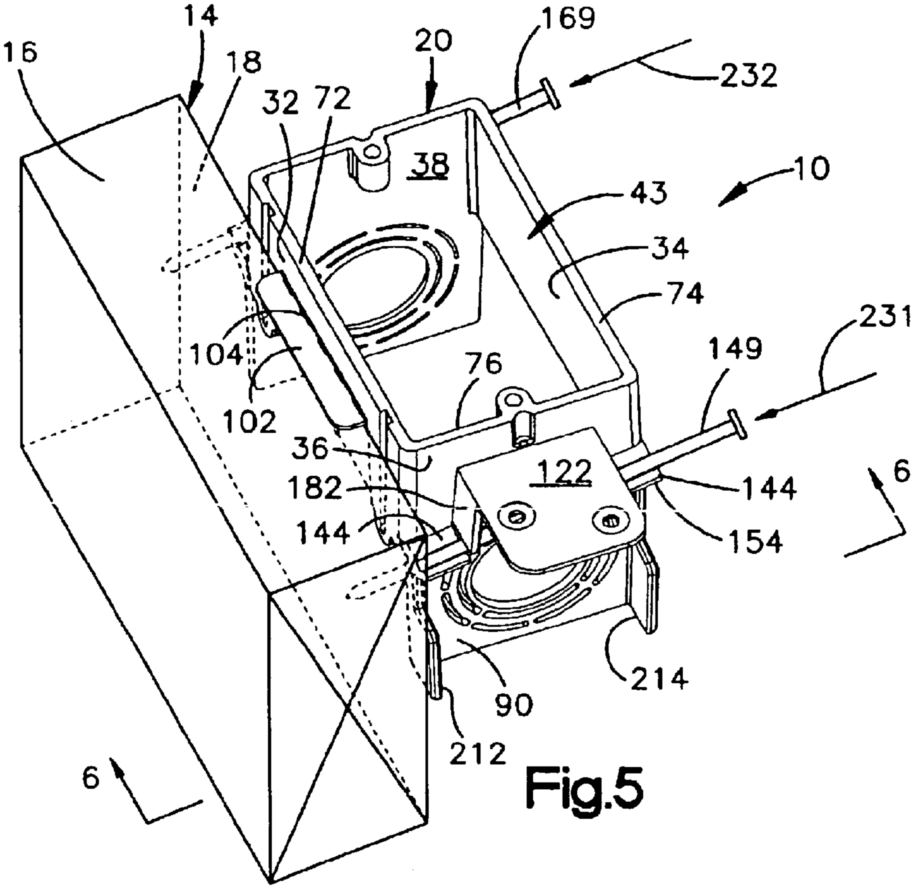
FIG. 5 is a perspective view of the bracket, shown mounted to the stud in a first side-mounted position.
Figure 6:
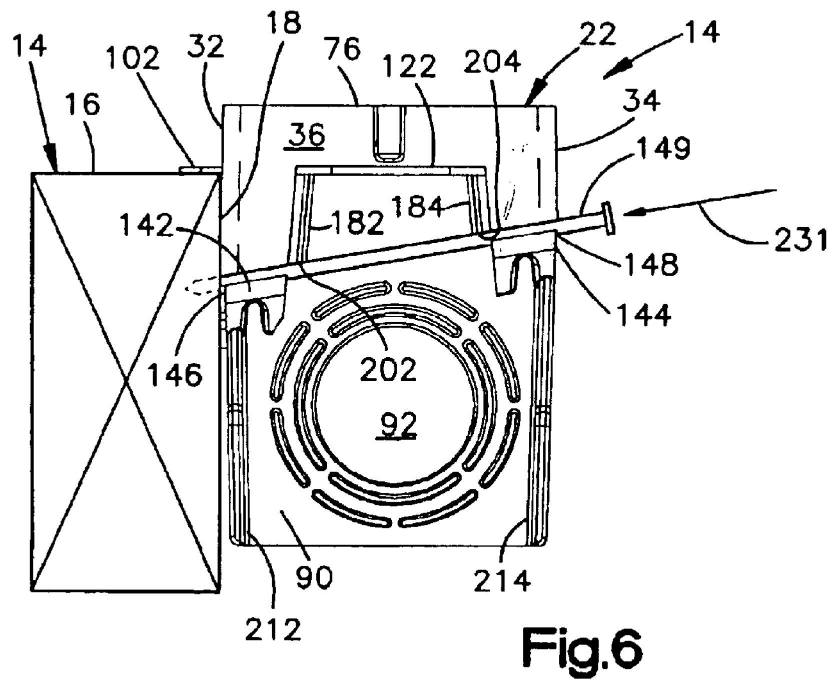
FIG. 6 is a view taken at line 6—6 of FIG. 5.

The frame 20 can be mounted to the stud 14 in the first side-mounted position as follows. First, the second side tab 112 can, optionally, be tom away from the frame 20 along its perforation 114, because the second side tab 112 is not needed for mounting the frame 20 in the first side-mounted position. Next, as shown in FIGS. 5 and 6, the first side surface 32 of the frame 20 is held flat against the side surface 18 of the stud 14, with the first side tab 102 abuttingly overlying the front surface 16 of the stud 14.

The first nail 149 is inserted between the nail abutting surfaces 202 and 204 of the front spacers 182 and 184 and the groove surfaces 146 and 148 (FIG. 3) of the first nail supports 142 and 144. As indicated by an arrow 231, the first nail 149 is hammered into the side surface 18 of stud 14. The second nail 169 is similarly inserted between the nail retainers 172 and 174 (FIG. 3) and the groove surfaces 166 and 168 of the second nail supports 162 and 164. As indicated by an arrow 232, the second nail 169 is hammered into the side surface 18 of stud 14. With the frame 20 thus fastened securely to the stud 14, the first side tab 102 can, optionally, be broken away from the frame 20 along its perforation 104. This avoids the possibility of a bulge in the drywall that later covers the tab 102.

Figure 7:
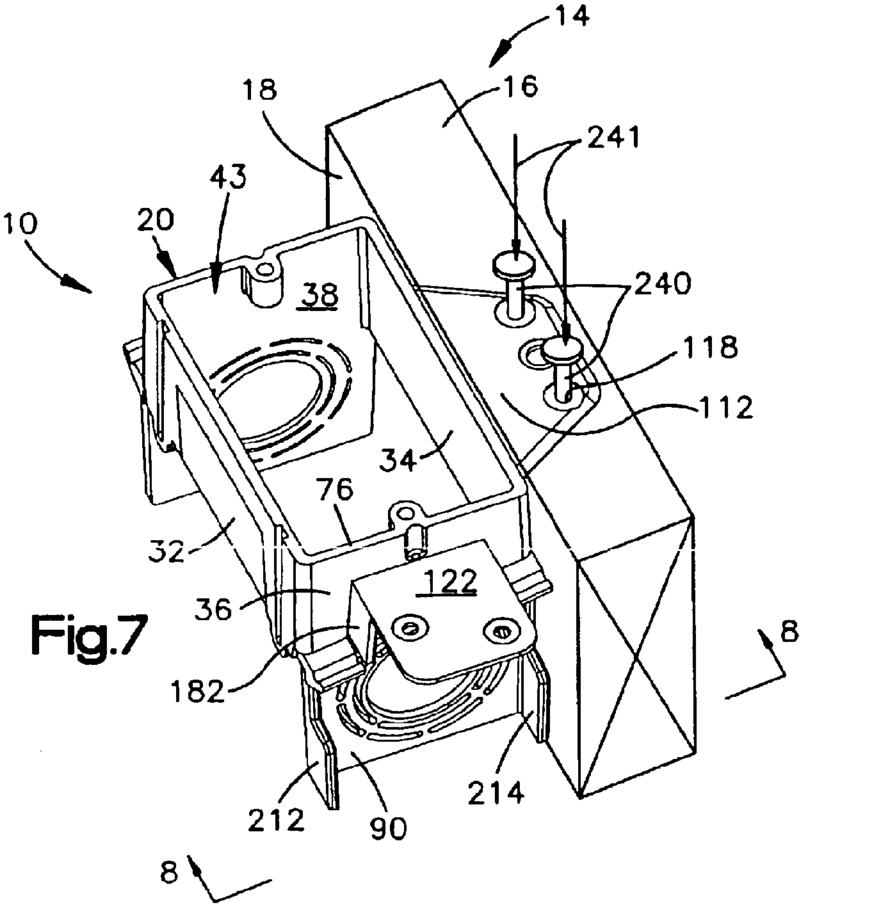
FIG. 7 is a perspective view of the bracket, shown mounted to the stud in a second side-mounted position.
Figure 8:
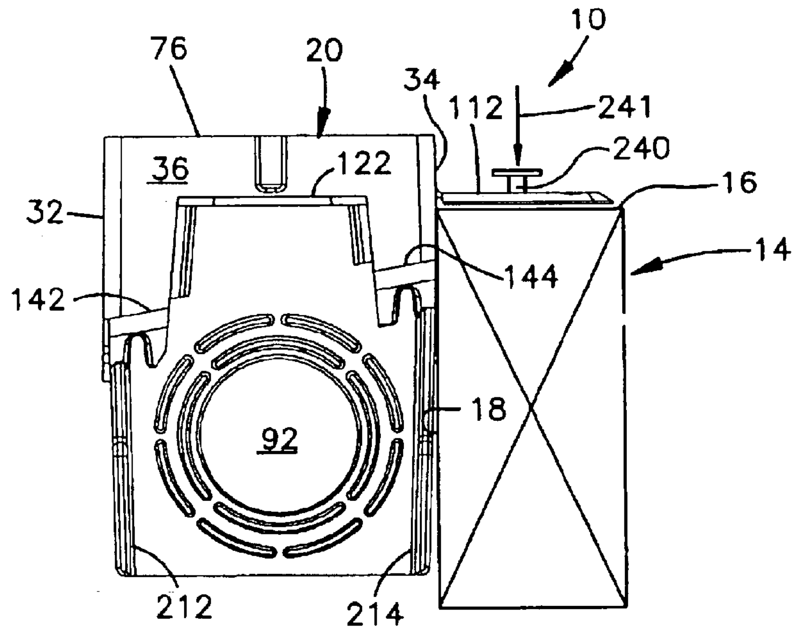
FIG. 8 is a view taken at line 8—8 of FIG. 7.

The frame 20 can be mounted to the stud 14 in the second side-mounted position as follows. First, the first side tab 102 (FIG. 1) can, optionally, be torn away from the frame 20 along its perforation 104, because the first side tab 102 is not needed for mounting the frame 20 in the second side-mounted position. Next, as shown in FIGS. 7 and 8, the second side surface 34 of the frame 20 is held flat against the side surface 18 of the stud 14, with the second side tab 112 abutting overlying the front surface 16 of the stud 14. The second side tab 112 is fastened to the stud 14 by hammering nails 240 through the nail holes 118 of the second side tab 112 and into the stud 14, as indicated by arrows 241.

Figure 9:
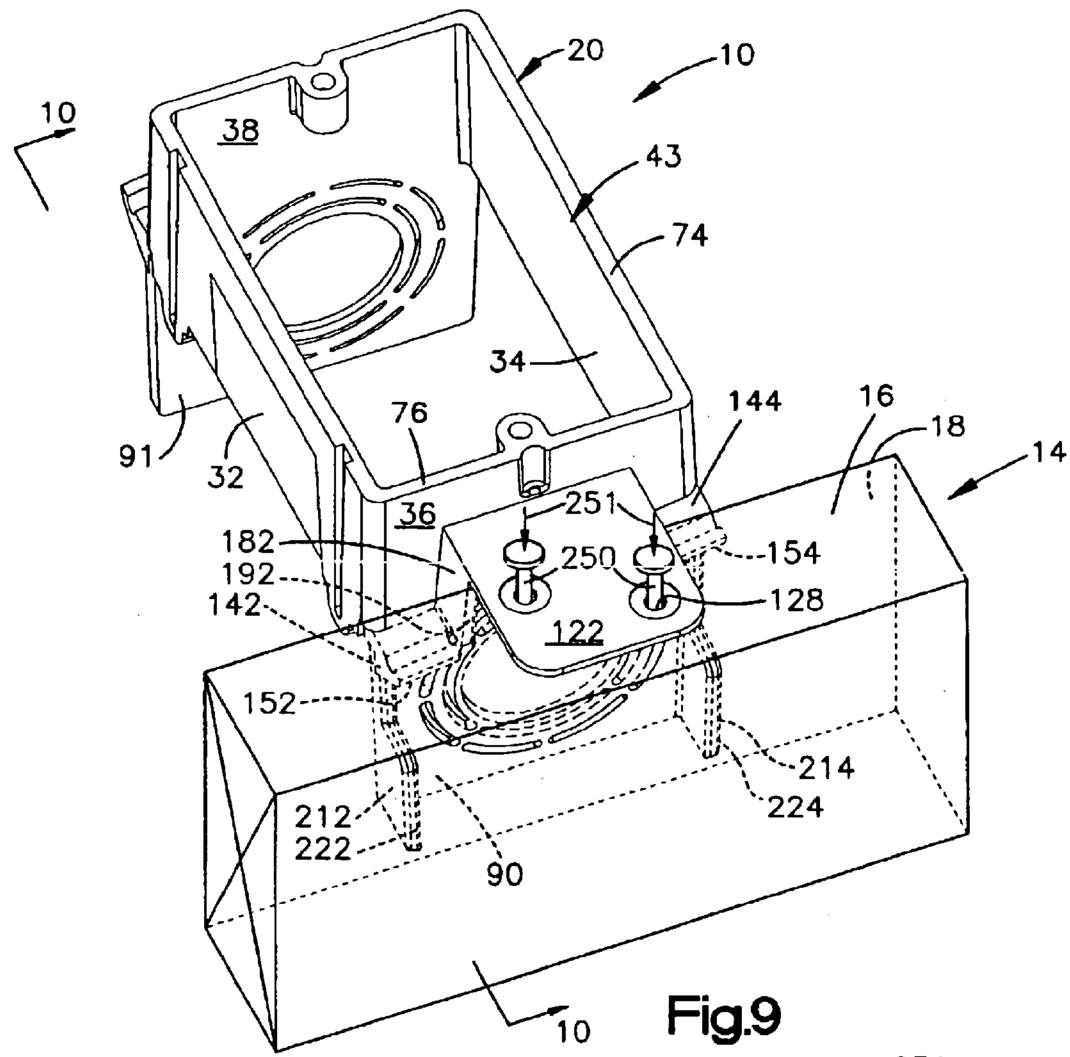
FIG. 9 is a perspective view of the bracket, shown mounted to the stud in an end-mounted position.
Figure 10:
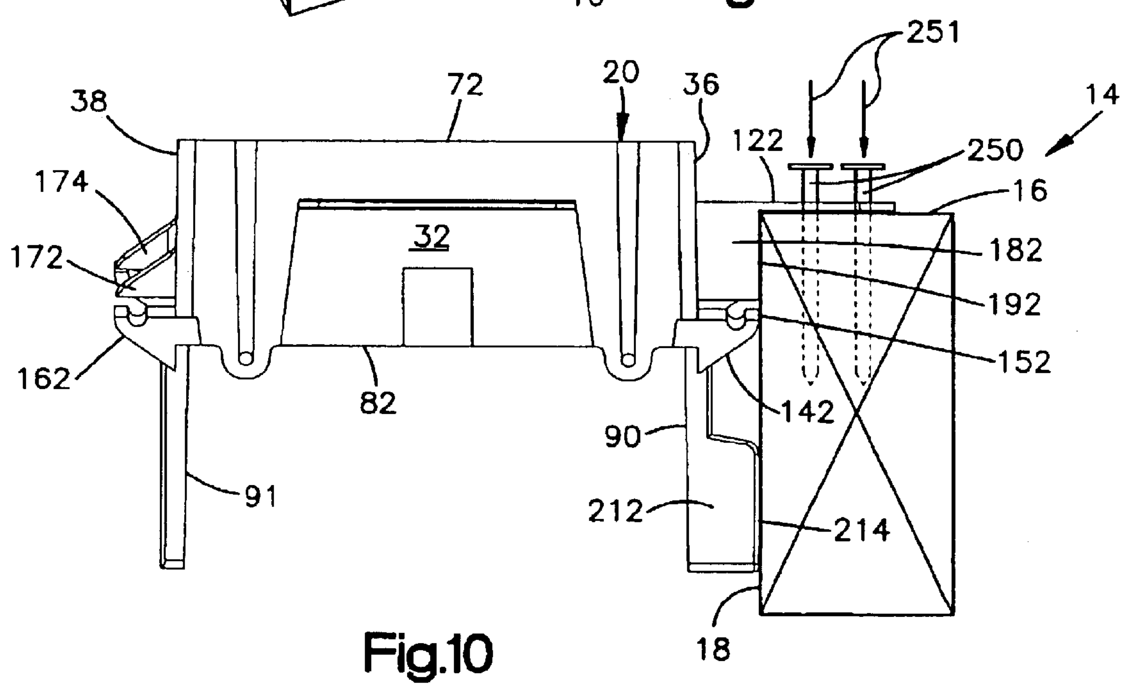
FIG. 10 is a view taken at line 10—10 of FIG. 9.

The frame 20 can be mounted to the stud 14 in the end-mounted position as follows. First, the side tabs 102 and 112 shown in FIG. 1 can be tom away from the frame 20 along their perforations 104 and 114, because the side tabs 102 and 112 are not needed for mounting the frame 20 in the end-mounted position. Next, as shown in FIGS. 9 and 10, the frame 20 is positioned such that the stud abutting edges 152, 154, 192, 194, 222 and 224 abut the side surface 18 of the stud 14, and the end tab 122 abuttingly overlies the front surface 16 of the stud 14. Next, the end tab 122 is fastened to the stud 14 by hammering nails 250 through the holes 128 of the end tab 122 and into the front surface 16 of the stud 14.

As shown in FIG. 1, the bracket 10 further has two fastener loops 260 extending rearward from the rear edge 82 of the first side wall 32. The fastener loops 260 define transversely-extending holes 261. The holes 261 are configured to receive screws (not shown) for fastening the first side wall 32 to a side surface of a stud.

This written description uses examples to disclose the subject technology, including the best mode, and also to enable any person skilled in the art to make and use the subject technology. The patentable scope of the subject technology is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

What is claimed is:

1. An electrical bracket comprising:

a wall structure defining a front opening; and at least one mounting member coupled to the wall structure for attaching the wall structure to a stud, the at least one mounting member being coupled to the wall structure along a weakened portion that is configured to be broken away from the wall structure with the application of a force sufficient to break the weakened portion.

2. The electrical bracket of claim 1, further comprising an alignment member for aligning the wall structure on a stud, the alignment member having a weakened portion for breaking the alignment member away from the wall structure with the application of a force sufficient to break the weakened portion.

3. The electrical bracket of claim 1, wherein the at least one mounting member comprises a tab that extends outwardly from the wall structure.

4. The electrical bracket of claim 1, wherein the weakened portion comprises a plurality of perforations.

5. The electrical bracket of claim 1, wherein the mounting member comprises at least one through hole for accepting a fastener.

6. The electrical bracket of claim 1, further comprising an alignment member for aligning the wall structure relative to a surface, the alignment member having a weakened portion for breaking the alignment member away from the wall structure with the application of a force sufficient to break the weakened portion.

7. An electrical bracket comprising:

a wall structure defining a front opening; and a first mounting member for mounting the wall structure to a stud in a first orientation, said first mounting member coupled to the wall structure of the bracket along a weakened portion that is positioned between the first mounting member and the wall structure, wherein the first mounting member is configured to be broken away from the wall structure of the bracket with the application of a force sufficient to break the weakened portion.

8. The electrical bracket of claim 7, further comprising at least one second mounting member for mounting the wall structure to a stud in a second orientation.

9. The electrical bracket of claim 8, wherein the second orientation is different from the first orientation.

10. The electrical bracket of claim 8, further comprising an alignment member for aligning the wall structure against a stud.

11. The electrical bracket of claim 10, wherein at least one of the second mounting member and the alignment member are coupled to the wall structure of the bracket along a weakened portion that is positioned between the respective member and the wall structure, with the respective member being configured to be broken away from the wall structure of the bracket with the application of a force sufficient to break the weakened portion.

12. The electrical bracket of claim 11, wherein the weakened portion of the first mounting member comprises a plurality of perforations; and the weakened portion of the at least one of the second mounting member and alignment member comprises a plurality of perforations.

13. The electrical bracket of claim 7, wherein the weakened portion comprises a plurality of perforations.

14. The electrical bracket of claim 7, wherein the first mounting member comprises at least one through hole configured to accept a fastener for fastening the wall structure to a stud.

15. An electrical bracket comprising:

a wall structure defining a front opening; and at least one alignment member coupled to the wall structure for aligning the wall structure to a mountable surface, the at least one alignment member being coupled to the wall structure along a weakened portion that is configured to be broken away from the wall structure with the application of a force sufficient to break the weakened portion.

16. The electrical bracket of claim 15, further comprising at least one mounting member for coupling the wall structure to a surface.

17. The electrical bracket of claim 15, further comprising at least one mounting member for coupling the wall structure to a stud.

* * * * *